Patented Nov. 17, 1942

2,302,297

UNITED STATES PATENT OFFICE 2,302,297

CRACKING WITH SYNTHETIC GEL CATALYSTS

Gerald C. Connolly, Baton Rouge, La., assignor to Standard Oil Development Company, a corporation of Delaware No Drawing. Application April 5, 1938, Serial No. 200,270

2 Claims. (Cl. 196—52)

This invention relates to using catalysts of the adsorptive type for the cracking of hydrocarbon oils.

It previously has been known that the cracking of hydrocarbons can be catalyzed by carrying out the reaction in the presence of adsorptive clays which are naturally active or which have been activated by known treatments such as by acid treatment, for example. It has been found that such cracking treatment results in the formation of higher yields of motor fuel having superior anti-knock properties. During the course of such treatment the surface of the catalyst becomes more or less rapidly fouled with carbonaceous deposits which reduce the activity of the catalyst. As a result it becomes necessary in such reactions to periodically interrupt the treatment to remove such deposits. This can be accomplished by burning such carbonaceous deposits with an oxidizing gas such as air. Such regeneration treatment results in the evolution of large amounts of heat.

It is generally known, however, that the catalytic efficiency of adsorbent clays is adversely affected by high temperatures, such as, for example, temperatures in excess of 1000° F. In view of this, various means have been proposed to effect rapid removal of heat liberated during regeneration in order to mhaintain the regeneration temperature below the maximum permissible limits. For example, one of the more common methods of controlling regenerating temperature is to dilute the oxidizing gas with inert gases to lower the rate of combustion and increase the capacity of the gases to remove the heat of reaction. It has also been proposed to provide indirect heat exchangers within the reaction chamber. All such provisions, however, materially increase the cost of equipment necessary for carrying out the process. The use of diluent gases, for example, increases the time required for regeneration with a consequent lengthening of the period during which the catalyst is out of operation and if the catalyst is regenerated within the reaction chamber in which the cracking is accomplished, which is the common practice, it also increases the number of reaction chambers required to produce a given quantity of final product.

It has been further found that even when the temperature is closely regulated during regeneration the efficiency of such adsorptive clay catalysts is gradually reduced over extended periods. While the exact reason for this is not fully known, one explanation may be that the carbonaceous deposits contain traces of constituents formed during the cracking or regeneration treatment, such, as for example, graphitized carbon, which cannot be burned at the low temperature necessary to avoid rapid deactivation of the catalyst.

In order to overcome the objections inherent in adsorptive clays, attempts have been made to produce a synthetic adsorbent contact material which will not be subject to the same limitations, but as far as I am aware, such attempts have not heretofore resulted in any measure of success.

The catalytic efficiency and regenerative properties of adsorptive type catalysts are dependent not only on its chemical composition, but also to its physical structure. The adsorbent properties of such catalyst is commonly attributed to the presence of an infinite number of submicroscopic pores dispersed throughout the material forming a large internal surface through which the reactants permeate and in which the reaction is brought about. One of the reasons for previous failures to synthesize adsorptive catalysts for hydrocarbon cracking has been the inability to carry out the syntheses in such manner as to produce a catalyst of the desired physical structure.

It is an object of the present invention to use a cracking catalyst for hydrocarbon oil adapted for repeated regeneration by oxidation, the activity of which is less sensitive to high temperatures and which will consequently permit the maintenance of higher regenerating temperatures.

A further object of the invention is to use a cracking catalyst of higher initial efficiency which can be maintained over longer periods despite repeated regenerations by oxidation.

Various other more detailed objects and advantages of the invention will be apparent from the more detailed description hereinafter.

The present invention in its broader aspects is directed primarily to the use of a catalyst having the desired physical structure which has been found to provide maximum catalyst efficiency and improved regenerating properties.

For illustrative purposes the production of a catalyst comprising silica and alumina will be described as the preferred embodiment, it having been found that these two components, when combined in accordance with the method hereinafter described, form a catalyst for cracking hydrocarbon oils of greater efficiency and less sensitivity to high temperatures than adsorbent catalysts heretofore employed. It will be understood, however, that the invention in some of its broader aspects is not limited to the specific chemical composition of the catalyst, but to a method of producing a catalyst of improved physical structure.

In accordance with the invention, an alkaline solution of sodium silicate is combined with an acid solution containing a hydrolyzable salt of aluminum, such as aluminum sulphate or chloride, under such conditions that the resulting solution is capable of setting to form a hydrogel.

To this end, the acidity and alkalinity of the two components are controlled so that the resulting combined solutions contain excess acid.

To avoid immediate precipitation, the two solutions are preferably combined either confluently or the silicate solution is added to the acid solution.

If proper conditions are maintained, a solution is obtained which, upon standing, gradually sets into a hydrogel. The solution is then allowed to stand until a firm hydrogel is formed and syneresis is fully developed to a point at which the structure begins to crack. When the solution contains about 0.5 N excess acidity, a firm hydrogel will form in from 8 to 12 hours.

The hydrogel so formed is then broken into small lumps of approximately ½ to 1 inch in size. The hydrogel is then thoroughly washed with water until substantially free of acid ions. When the original acid solution contains free sulphuric acid, for example, the washing is continued until the wash water is free of sulphate ions. If other acids are employed, the washing is continued until free of the corresponding acid ions.

The washed hydrogel is then drained and dried at a temperature preferably not exceeding 212° F. during the initial drying stage until the product has a dry appearance, after which it may be slowly heated to higher temperatures, such as 800° F., to expedite the dehydration. The product may then be used as a catalyst either in granular form or converted into units of uniform size and shape, either by pilling or extruding.

The relative proportions of silica and alumina present in the final product can be varied at will be controlling the relative proportions and concentrations of the reacting constituents. It has been found that variations in the molar ratios of silica to alumina ranging from 2 to 1 to 10 to 1 have very little if any effect on the cracking efficiency.

As a further phase of the invention, the cracking efficiency of the catalyst prepared according to the method herein described can be further improved by treating the hydrogel formed as an intermediate product either before or after the washing operation with an ammonium hydroxide solution. I have discovered that the porosity of the product can be improved by the ammonium hydroxide treatment. Moreover, a treatment of the hydrogel with ammonium hydroxide prior to the washing treatment helps to retain alumina which might otherwise be removed by the washing treatment.

In place of ammonium hydroxide other basic solutions of alkaline or alkaline earth metals or organic bases may be used. In event alkali or alkali earth metal hydroxide solutions are employed, it is important to completely remove the metal ions prior to use of the product as a catalyst. Since removal of such metal ions involves additional washing, it is preferred to add the basic solutions to the unwashed hydrogel so that the washing of the hydrogel can be accomplished in a single treating operation. It is also beneficial to partly or completely neutralize the basic solution prior to the washing treatment, since the salt washes more readily than the hydroxide. If organic bases are employed, they may be washed as in the case of the ammonium hydroxide or volatilized by heating.

Catalysts produced according to the present invention have an apparent density ranging from 0.4 to 0.8, depending on the relative proportions of silica and alumina present and the conditions of treatment, particularly the concentration of ammonium hydroxide employed.

The term "apparent density" as here employed means the weight in grams per cubic centimeter of 4 to 12 mesh granules. Apparent density measurements have been found to be an indirect but nevertheless definite function of the size of the ultramicroscopic pores within the catalyst. Catalysts having apparent densities of from 0.5 to 0.7 and particularly 0.6 exhibit maximum efficiency.

The terms "plural gel" or "plural hydrogel" as herein employed means a gel or hydrogel comprising a plurality of oxides formed from a common hydrosol containing said oxides in colloidal form.

As a guide in carrying out the invention to obtain the greatest benefits therefrom, the following example may prove helpful, it being understood that the specific conditions specified are illustrative rather than limitative.

To a sodium silicate solution of about 12 Bé. gravity having a molecular ratio of $Na_2O$ to $SiO_2$ of about 1 to 3.5 there are added about 3.3 grams of NaOH for each liter of sodium silicate used.

A second solution is prepared containing about 113.5 grams of $Al_2(SO_4)_3.15H_2O$ per liter to which about 35.0 grams of $H_2SO_4$ have been added. The silicate solution is then added to the sulphate solution at room temperature in proportions such that the mol ratio of $SiO_2$ to $Al_2O_3$ is about 10 to 1

During the mixing the solution is vigorously stirred to insure homogeneity of the resulting solution.

The resulting solution contains about 0.4 N excess acidity. At the end of from 8 to 12 hours, depending on the temperature, the solution sets into a firm hydrogel. When the gel has been fully developed so that it begins to crack, it is broken up into small lumps which may be about ½ to 1 inch in size, for example.

These lumps are then immersed in an ammonium hydroxide solution containing about 100 grams of concentrated ammonium hydroxide solution per liter and allowed to stand at room temperature for from 12 to 24 hours. The hydrogel is then drained and washed with water free of alkaline constituents until the wash water is substantially free of sulphate ions. In event that the wash water contains small percentages of alkali or alkaline earth metals, ammonium chloride may be added to the wash water during the last stages of the washing process. The washed hydrogel is then drained and dried at a temperature below 212° F. until it appears dry. It is then slowly heated to a temperature of about 800° F. and is then ready for use as a catalyst. It may be used in lump form as recovered from the drying operation or it may be preformed into units of uniform size by pilling or extruding.

As illustrative of the efficiency of the catalyst forming a part of the invention, the following comparative tests are submitted:

In each test, East Texas gas oil of 33.8 A. P. I gravity was used as cracking stock. The cracking process was carried out over 2-hour cycles; the average temperature maintained was 850° F. and the rate of feed was 0.6 volume of liquid feed per volume of catalyst per hour. The percentage conversion was measured as the per cent by weight of liquid distillate boiling below 400° F. The various catalysts were used in pill form of uniform size of approximately 1 centimeter in diameter and 2 centimeters in length.

Test 1

Dry silica gel was powdered and pilled. The pilled catalyst so produced when employed under the above conditions resulted in an average conversion of about 2%.

Test 2

Dried alumina gel pills formed in the same manner resulted in an average conversion of about 16%. These tests illustrate that both silica gel and alumina gel when employed alone, even though they possess adsorbent properties, have low catalytic activity.

Test 3

A series of composite catalysts, formed by mixing dry silica and alumina gels in such proportions as to produce a molar ratio of silica to alumina of 15 to 1, 10 to 1, 7.5 to 1, 5 to 1 and 2.5 to 1 resulted in conversions of 12.5%, 16.5%, 16%, 16.5% and 16.5% respectively.

Test 4

A series of catalysts were prepared according to another conventional method in which silica gel was impregnated with aluminum nitrate solutions of varying concentrations to form final products having weight ratios of silica to alumina of 1.25, 2.5, 5 and 7.5. The resulting product was dried and heated to decompose the nitrate to the oxide. The samples were then pilled and tested with the resultant conversions of 16%, 16.5%, 22% and 21.5%, respectively.

Tests 3 and 4 show that composite catalysts of silica and alumina prepared according to the commonly known method possess relatively low catalytic activity.

Test 5

A series of catalysts were prepared according to the present invention outlined in the specification in which the ratio of silica to alumina was 10 to 1, 7.5 to 1 and 5 to 1. The catalysts when tested resulted in conversions of 53%, 47%, and 54%, respectively.

For comparative purposes the above results are summarized in the following table:

| Catalyst | Preparation | Molar ratio of silica and alumina | Conversion |
|---|---|---|---|
| | | | Per cent |
| Silica gel | Dry silica gel pills | | 2 |
| Alumina gel | Dry alumina gel pills | | 16 |
| Silica+alumina | Mixed dry gel pills | 15-1 | 12 |
| Do | do | 10-1 | 16 |
| Do | do | 7.5-1 | 15 |
| Do | do | 5-1 | 15 |
| Do | do | 2.5-1 | 16 |
| Do | Al(NO₃)₃ impregnated silica gel | 2-1 | 15 |
| Do | do | 4-1 | 16 |
| Do | do | 8.5-1 | 21 |
| Do | do | 12-1 | 20 |
| Do | Applicant's method | 10-1 | 53 |
| Do | do | 7.5-1 | 47 |
| Do | do | 5-1 | 54 |
| Do | Activated clay | 7-1 | 40 |

In order to determine the effect of high temperature on the activity of the catalyst having a mol ratio of 10 to 1, separate samples were heated in a muffle temperature to 1000, 1200, 1400 and 1600° F., for an extended period. Conversion tests under the same conditions heretofore specified resulted in conversions of 50%, 45%, 42% and 38.5%, respectively. It will be evident from the above that the catalyst retained 77% of its original efficiency at 1600° F.

For comparative purposes, samples of fresh activated clay of the type known as "Superfiltrol" were subjected to the same temperature conditions. Subsequent cracking tests under the same conditions resulted in conversions of 39%, 31%, 30% and 2%, respectively.

"Superfiltrol" was chosen for comparative purposes because it is generally accepted as the most effective of all the active or activated clays for carrying out catalytic cracking.

It will be seen from these data that catalysts forming the subject matter of this application, when heated to temperatures of 1600° F. have a catalytic efficiency substantially the same as freshly activated clay, whereas clay, after having been subjected to the same treatment, has virtually lost its cracking efficiency.

While I have described the production of a catalyst particularly suited for the cracking of hydrocarbon oil, it will be understood the catalyst may have other aplications, such as in the decolorizing, purifying and refining of oils and polymerization, hydrogenation and dehydrogenation of hydrocarbons.

Having thus described the preferred form, it will be understood that the invention embraces such other modification as fall within the spirit and scope thereof. It will be understood also that it is not my intention to abandon or dedicate any novel features of my invention.

I claim:

1. A method of cracking hydrocarbon oils which comprises passing said oil at cracking temperature over a cracking catalyst comprising a synthetic plural gel produced by the conjoint precipitation of silica and alumina from an acid solution, from which gel the excess acid has been neutralized by ammonia and the water soluble salts washed off; the rate of oil flow being sufficient to effect the desired conversion.

2. The method defined in claim 1 wherein the molar ratio of silica to alumina in the catalyst is between about 2 to 1 and about 10 to 1.

GERALD C. CONNOLLY.